United States Patent [19]
Sievers et al.

[11] Patent Number: 5,742,346
[45] Date of Patent: Apr. 21, 1998

[54] SPATIALLY ADAPTIVE BLUR FILTER

[75] Inventors: John C. Sievers, Wakefield; John E. Bruder, Arlington, both of Mass.

[73] Assignee: Picture Tel Corporation, Peabody, Mass.

[21] Appl. No.: 287,686

[22] Filed: Aug. 9, 1994

[51] Int. Cl.$^6$ .................................................. H04N 7/24
[52] U.S. Cl. ............................................. 348/420; 348/390
[58] Field of Search .................................. 348/38.4, 390, 348/404, 405, 419, 429, 607, 608, 627, 409–412, 420; 382/232, 236, 238, 251, 252; H04N 7/130

[56] References Cited

U.S. PATENT DOCUMENTS

| | | | |
|---|---|---|---|
| 4,754,492 | 6/1988 | Malvar | 382/41 |
| 4,984,076 | 1/1991 | Watanabe et al. | 348/405 |
| 5,027,206 | 6/1991 | Vreeswijk et al. | 348/429 |
| 5,065,446 | 11/1991 | Suzuki et al. | 382/56 |
| 5,107,346 | 4/1992 | Bowers et al. | 358/447 |
| 5,113,457 | 5/1992 | Enomoto et al. | 382/56 |
| 5,132,797 | 7/1992 | Citta | 348/607 |
| 5,177,796 | 1/1993 | Feig et al. | 382/56 |
| 5,177,797 | 1/1993 | Takenaka et al. | 382/56 |
| 5,181,100 | 1/1993 | Hodgson | 348/607 |
| 5,253,059 | 10/1993 | Ansari et al. | 348/390 |
| 5,265,180 | 11/1993 | Golin | 348/384 |
| 5,283,646 | 2/1994 | Bruder | 348/420 |
| 5,293,230 | 3/1994 | Golin | 348/384 |
| 5,323,187 | 6/1994 | Park | 348/405 |
| 5,333,212 | 7/1994 | Ligtenberg | 348/390 |
| 5,367,385 | 11/1994 | Yuan | 348/420 |
| 5,369,447 | 11/1994 | Soloff | 348/627 |
| 5,384,869 | 1/1995 | Wilkinson et al. | 348/384 |

OTHER PUBLICATIONS

Wallace, "The JPEG Still Picture Compression Standard", pp. 1–8, Dec. 1991.
Randall et al., "Standards for Video Codec" (No Date).
Ramamurthi et al., "Nonlinear Space-Variant Postprocessing of Block Coded Images", *IEEE Transactions on Acoustics, Speech, and Signal Processing*, vol. ASSP-34, No. 5, Oct., 1986, pp. 1258–1267.

*Primary Examiner*—Richard Lee
*Attorney, Agent, or Firm*—Fish & Richardson P.C.

[57] ABSTRACT

A method and apparatus for selectively pre-filtering signal representations of images representing data to be transmitted and substantially maintaining the frame rate of transmission by reducing the number of expected bits needed to transmit the selected block portions of an image frame. The pre-filter uses the quantizer state value representative of the number of expected bits required for each block portion of the image as well as a weighted energy error value based on the preselected coding method of the block of the image being transmitted to determine a level of prefiltering required. The prefilter, for example, may be a multi-tap filter having a center tap and outer taps with amplitudes based on the quantizer state and weighted error energy values.

25 Claims, 6 Drawing Sheets

1

SPATIALLY ADAPTIVE BLUR FILTER

BACKGROUND OF THE INVENTION

This invention relates to video imaging compression systems.

The quality of a transmitted video sequence is limited to a large extent by the bandwidth of the communications channel used to transmit the data representing the sequence. Thus, in most video compression systems a decision is made as to how to allocate available transmitter bits to each image or frame of video to be compressed.

One method of compressing images is to divide the two-dimensional array of data representing the image into a plurality of blocks, each block being a sub-array of image representing data called pixels or pels. Each block is then encoded using one of a variety of encoding techniques. One technique, for example, applies a transform function such as a discrete cosine transform (DCT) to the block and quantizes the coefficients using one of a range of quantizer step sizes. When the image significantly changes between successive frames, such as when objects move rapidly, annoying blocking and mosquito artifacts may become visible. Blocking artifacts appear as a grid of tiles which, when the movement ends, fade away in successive frames. Mosquito artifacts, on the other hand, appear as an aura or halo of flickering patterns around moving objects. The effect of these artifacts (commonly referred to as "overload" effects) on the quality of the image can be mitigated by reducing the frame rate of the image transmission in order to allow more bits to be transmitted per frame, or equivalently to use a smaller quantizer step size. However, the slower frame rate may result in the loss of lip synchronization between the video image and the accompanying audio track, thus destroying the sense of real-time presence in a videoconference.

SUMMARY OF THE INVENTION

The invention relates to a method and apparatus for prefiltering image data to reduce the resolution of selective portions of an original image, such as those corresponding to moving objects, and to provide a "blurred" version of these portions prior to encoding of the data. Thus, a finer quantization of each image frame is provided without having to reduce the transmitter frame rate and synchronization between the audio and video portions of the videoconference is more easily maintained. Concomitantly, the reduction in resolution occurs in a manner that can significantly reduce blocking and mosquito artifacts. In other words, a sacrifice in the resolution of selected portions of the image is tolerated in order to reduce the number of bits required to transmit the frame, thereby enabling a higher frame rate.

In one aspect, the invention provides a method and apparatus for stabilizing the number of bits expected to be required to transmit an image frame as a sequence of block portions by determining a level of filtering to be applied to each block portion, if at all, on the basis of a determined measure of expected bits required for each block portion of the image frame being transmitted. The determined level of filtering for the block is then applied to the data representing the block portion, whereby the number of bits needed to transmit the block portion will be reduced, if at all, depending upon the level of filtering.

In another aspect, the invention relates to a method and apparatus for stabilizing the number of bits expected to be required to transmit an image frame as a sequence of block portions in a video imaging compression system having an encoder. A complexity value (e.g., a quantizer state value), representative of the expected number of bits required for transmitting the image is computed. A weighted energy error value, associated with each block portion, that is based on a preselected coding method for the block portion of the image, is also computed. The complexity value and weighted energy value are used to determine a level of filtering, for each block portion which is then applied to the data representing the block portion whereby, the number of bits needed to transmit the block portion will be reduced, if at all, depending upon the level of filtering.

In still a further aspect of the invention, a method features the steps of receiving a quantizer state value (q_state) representative of the expected number of bits required for transmitting the image, receiving, for each block portion, a weighted energy error value based on a preselected coding method for the block portion of the image, and determining, for each block portion, one of a plurality of filter state (fil_state) values on the basis of the relationship:

$$\text{fil\_state} = 0, \quad \text{for } q\_state < min\_state$$

$$\text{fil\_state} = \frac{(q\_state - min\_state) \ast max\_fil}{max\_state - min\_state}, \quad \text{for } \begin{array}{l} min\_state \leq q\_state, \\ q\_state \leq max\_state \end{array}$$

$$\text{fil\_state} = max\_fil \quad \text{for } q\_state > max\_state$$

where fil_state is the filter state value;

q_state is the quantizer state value;

min_state is the preselected adjustable minimum state value;

max_state is the preselected adjustable maximum state value; and max_fil is the preselected adjustable maximum filter value.

The filter state value is then used to determine a level of filtering which is applied to the data representing the block portion whereby the number of bits needed to transmit the block portion will be reduced, if at all, depending upon the level of filtering.

In preferred embodiments, a multi-tap filter having a center tap and a plurality of outer taps is applied to each block portion. For example, a three tap FIR filter having a center tap h(0), a pair of equal amplitude outer taps h(−1) and h(1), and characterized by the fact that h(0)=1−[h(1)+h(−1)] is used. The filter state value, for each block portion, is then determined on the basis of the relationship:

$$h(1) = 0, \quad \text{for } w\_ener < min\_val$$

$$h(1) = \frac{(w\_ener - min\_val) \ast fil\_state}{max\_val - min\_val}, \quad \text{for } \begin{array}{l} min\_val \leq w\_ener, \\ w\_ener \leq max\_val \end{array}$$

$$h(1) = fil\_state \quad \text{for } w\_ener > max\_val$$

where h(1) is the amplitude of the outer tap of a three tap FIR filter;

min_val is the preselected adjustable minimum energy value;

max_val is the preselected adjustable maximum energy value; and w_ener is the weighted logarithm of the energy error value.

In another aspect of the invention, the prefiltering is performed using a processor having a multi-tap filter with a center tap and a plurality of outer taps each having an amplitude. The amplitudes of the center and outer taps are applied to each block portion of an image frame and are determined on the basis of the quantizer state values and the weighted energy error value.

In preferred embodiments, the invention comprises one or more of the following features. The multi-tap filter preferably has a center tap and a pair of outer taps. The outer taps are of equal amplitude and are equally spaced from the center tap with the sum of the amplitudes of the center taps and outer taps being equal to unity. Each block portion comprises rows and columns of pixels and filtering is applied to each row of pixels and then on each column of pixels of each block portion. The outer tap filters each pixel using adjacent pixels. The outer tap filters a pixel positioned on an outer boundary of the block by using a pixel from an adjacent block.

BRIEF DESCRIPTION OF THE DRAWINGS

Other objects, features, and advantages of the invention will be apparent from the following description, taken together with the drawings in which.

DESCRIPTION OF THE PREFERRED EMBODIMENTS

The invention relates generally to any video or image compression system. In the illustrated embodiment which follows, the invention is applied to a DCT coding system for encoding video sequences, for example in accordance with the TSS H.261 or ISO MPEG video compression standards. It can, however, as will be apparent to those practicing in this field, also be applied in other ways to single frame image compression systems, for example the ISO JPEG DCT image compression standard, and nontransform-based schemes or methods, including sub-band and spatial domain compression systems using scaler and/or vector quantizers.

Figure 1:
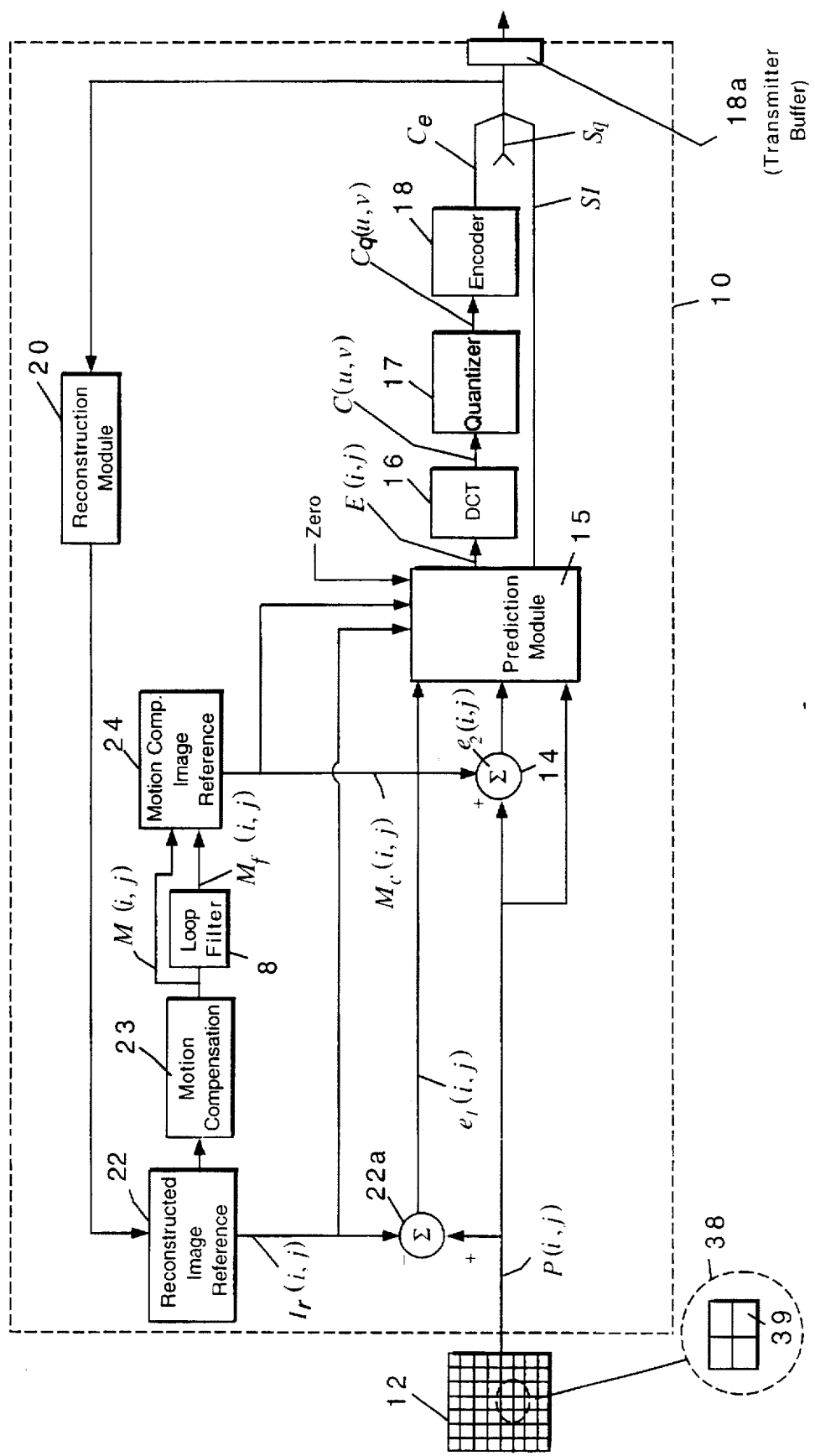
FIG. 1 is a block diagram of a transmitter for encoding image data using a block encoder.

Referring to FIG. 1, a system in which the invention has been implemented under the TSS H.261 standard has a transmitter 10 for encoding image data representative of an image 12 and for transmitting the encoded image data to a receiver 13 (FIG. 8) which reconstructs the image from the encoded data and displays it at a remote location. Image 12 consists of luminance and chrominance components.

The transmitter 10 separates the image into an array of macroblocks 38 each macroblock including a 16×16 sub-array of pixel luminance data and two 8×8 blocks of chrominance data. Each macroblock 16×16 pixel sub-array is further divided into four blocks 39, each block consisting of an 8×8 sub-array of pixel luminance data.

The transmitter is typically capable of encoding each macroblock of data using a variety of encoding methods. For each macroblock of data, the transmitter selects that encoding method which requires the fewest number of bits to describe the macroblock of data.

One class of such methods is referred to as "interframe" encoding. Interframe encoding techniques define each block of image data in terms of the differences between the block of data and a reference block of data taken from the most recently "transmitted frame". The transmitter transmits the difference information to the receiver. Since the receiver maintains a copy of the reference image, it can reconstruct the block of data by combining the difference information with the reference image.

Another technique is referred to as "intraframe" encoding. According to this technique, the transmitter transmits the original block of data, encoded, to the receiver. In effect, intraframe encoding describes each block of data in terms of the differences between the block of data and a zeroed reference block (a block in which each pixel data equals zero).

The transmitter may also send no information regarding a block of data. This tells the receiver that the corresponding block for the reference frame should be used as the block for the current frame.

In the illustrated embodiment, shown in FIG. 1, the transmitter includes a reconstruction module 20 which reconstructs each frame of the sequence of images from the transmitter's own transmission signal in a manner similar to the reconstruction process performed at the receiver. The transmitter stores the reconstructed image in a reconstructed frame reference memory 22.

For each block of "raw" pixel data $P(i,j)$, a subtractor 22a calculates the difference between the pixel values $P(i,j)$ of the block and a corresponding block of pixel values $I_r(i,j)$ in the reconstructed frame. The resultant error signal $e_1(i,j)$ is provided to a prediction module 15 for determining whether $e_1(i,j)$ will provide a more bit efficient representation of the block of data than the other encoded representations described below.

A second interframe encoding method prepares, for each block to be transmitted, a motion compensated image reference. Toward this end, a motion compensation module 23 searches for a nearby macroblock of data $M(i,j)$ in the reconstructed image 22 which closely matches the block to be coded. A switchable loop filter 8 typically filters the selected block. However, the filtered output $M_f(i,j)$ is only used if it more closely matches the pixel data $P(i,j)$ than the unfiltered version $M(i,j)$. The selected block of data ($M(i,j)$ or $M_f(i,j)$) is stored in a motion compensated image reference memory 24 for use as a reference $M_c(i,j)$ in encoding the block.

A second subtractor 14 subtracts each pixel value of the input block $P(i,j)$ to be coded from the corresponding pixel value of the motion compensated block $M_c(i,j)$. The resultant error signal $e_2(i,j)$ therefore represents the block in terms of the difference between the original block and the motion compensated reference block. Since the receiver can prepare the same motion compensated reference block, it can reconstruct the original block by combining the error signal $e_2(i,j)$ and the motion compensated reference block $M_c(i,j)$. The error signal $e_2(i,j)$ is also supplied to the prediction module 15 for comparison with the other candidate representations of the block.

Other interframe encoding methods are well known to those skilled in the art. However, the above techniques are used as examples to illustrate the operation of the transmitter.

Finally, for purposes of intraframe encoding, the original pixel data for the block P(i,j) is supplied to the prediction module 15.

Figure 2:
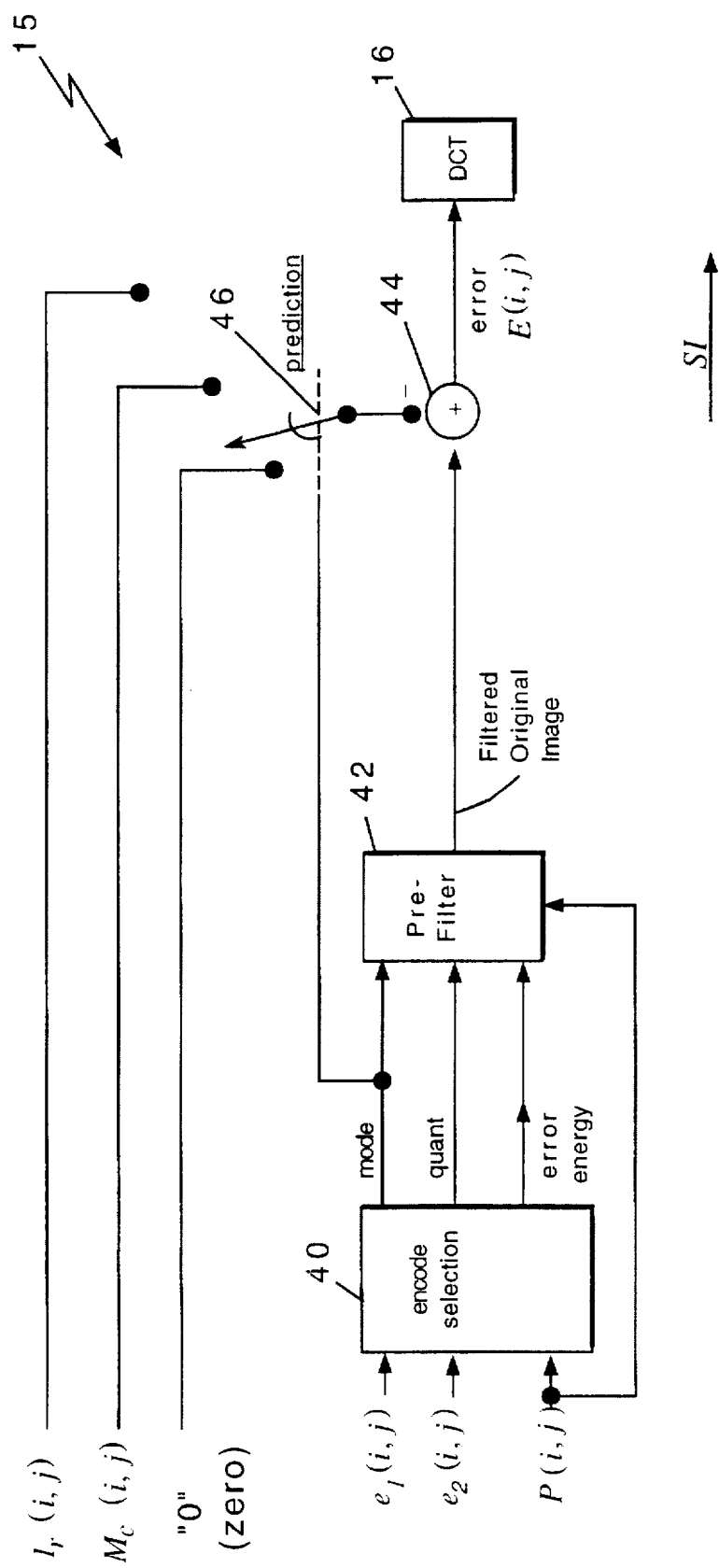
FIG. 2 is a block diagram of the prediction module portion of the transmitter of FIG. 1 including a prefilter.

Referring to FIG. 2, prediction module 15 includes an encode selector 40 which receives each of the error signals $e_1(i,j)$, $e_2(i,j)$ and the raw pixel data P(i,j). Prediction module 15 also receives the motion compensated reference block $M_c(i,j)$ as well as the corresponding block of pixels $I_r(i,j)$ in the reconstructed frame.

Encode selector 40 calculates error energies of each block depending on the coding mode selected for that block. For example, when a block is coded using interframe coding, encode selector 40 sums the squares of the differences (the values of $e_1(i,j)$ or $e_2(i,j)$) for each pixel of the block. On the other hand, for intraframe coding, the encode selector calculates the mean of all of the terms of P(i,j) for the block and then, from each pixel data term, subtracts the calculated mean value. The encode selector then sums the squares of the differences for each term of the block.

In either case, the encode selector calculates the logarithm (for example, base two) for each sum of the square of differences in order to facilitate performing mathematical operations on the energy values.

Based on the calculated error energies of the macroblock, encode selector 40 chooses the encoding mode which will require the least number of bits to be transmitted based on the error energies of the macroblock. It is important to note that in other embodiments, other information provided to the encode selector may be used to select the coding mode. For example, encode selector 40 processes these error energy signals along with other information to calculate the quantizer state using techniques well-known by those of skill in the art. Selecting a large quantizer state value generally means that there will be more error in the block after coding while a smaller quantizer state value generally means the block will be more accurately coded. The quantizer state is related to quantization step size by the following relationship:

$$\text{quantizer state} = K*2 \exp(\text{quantization step size})$$

where K is a constant.

In this embodiment, thirty-one quantizer step sizes are used in the encoding process, each quantizer step representing a different number of bits required for coding a sequence of blocks.

It is important to note that the error signals $e_1(i,j)$ and $e_2(i,j)$, provided to encode selector 40, correspond to macroblocks of pixel data. On the other hand, encode selector 40 calculates error energies for each of the six 8×8 blocks 39 (FIG. 1) of each macroblock. Thus, although the quantizer state and the coding mode are computed by the encode selector 40 on a macroblock-by-macroblock basis, the encode selector generates error energies on a block-by-block basis.

At this point the error signals $e_1(i,j)$ and $e_2(i,j)$ could be used with the appropriate blocks of pixel data [i.e., M(i,j), $M_c(i,j)$, P(i,j)] to directly generate resulting pixel error data for conversion into transform coefficients using a discrete cosine transform (DCT) module. The transform coefficients are then quantized and further encoded before being transmitted to receiver 13. Instead, however, the error signals and pixel data are used by a prefilter 42 to further process each block in order to maintain the transmitter frame rate, as well as the synchronization between audio and video portions of a videoconference, without introducing blocking and mosquito artifacts. Prefilter 42 also receives the block of "raw" pixel data P(i,j) and filters the pixel data P(i,j) appropriately based on the selected quantizer state, coding mode and the logarithm of the error energy value.

Figure 3:
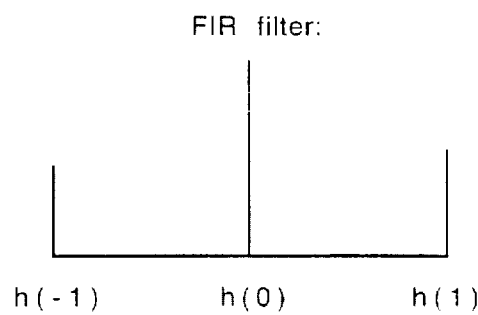
FIG. 3 is an example of an impulse response of the prefilter of FIG. 2.

As is shown in FIG. 3, prefilter 42, in the illustrated embodiment, is a three-tap FIR (Finite Impulse Response) filter having a center tap h(0) and a pair of equal amplitude outer taps h(−1) and h(1). Prefilter 42 is further characterized by the fact that the sum of the amplitude values of the three taps is equal to unity. Thus, since h(−1) equals h(1) and h(−1)+h(1)+h(0)=1, then h(0)=1−2*h(1). Further, when h(−1) and h(1) equal zero, h(0) equals 1 and no prefiltering is performed. On the other hand, in this embodiment, as h(1) and h(−1) increase to a maximum of ⅛, the degree of prefiltering likewise increases.

Figure 4:
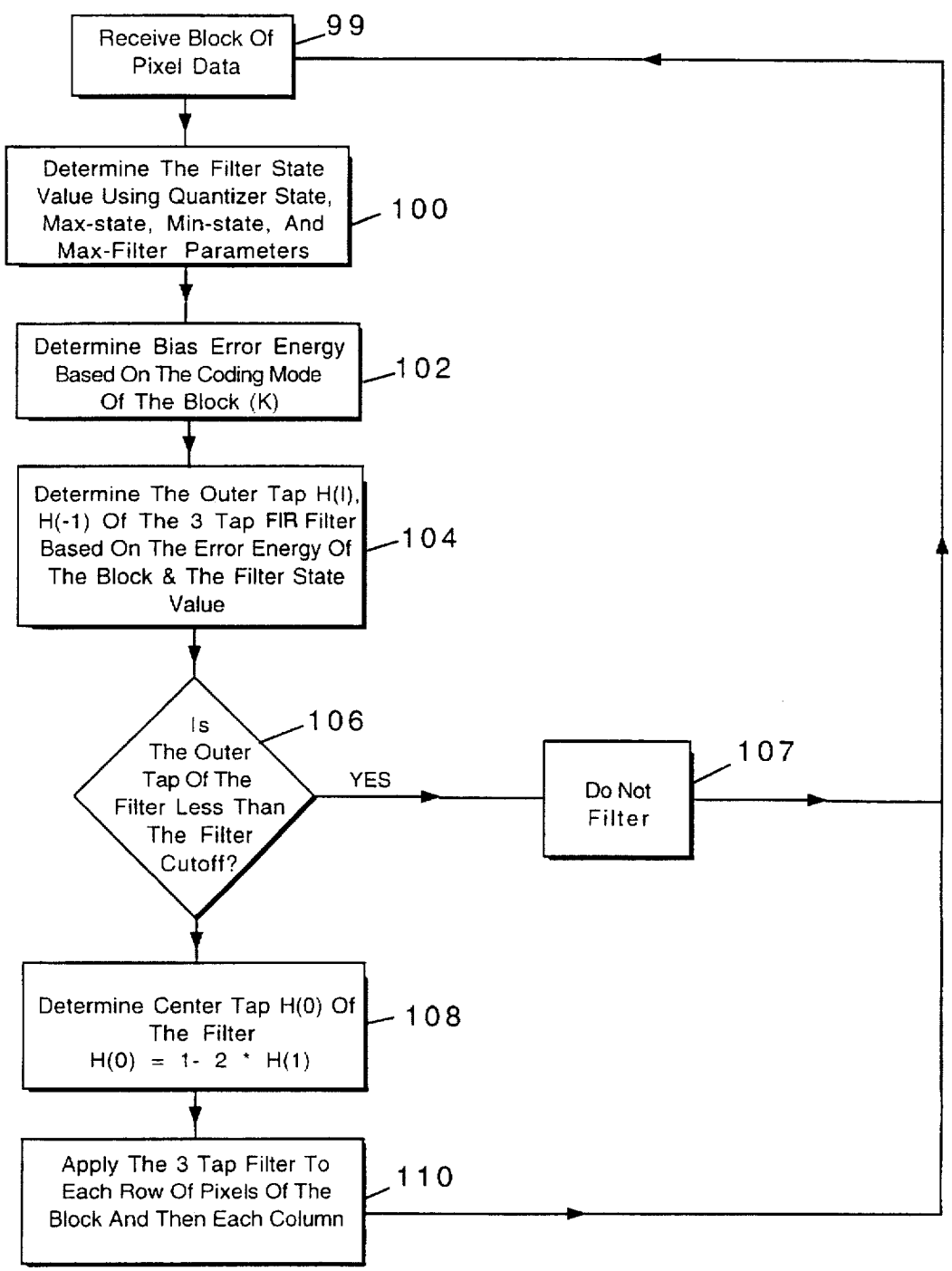
FIG. 4 is a flowchart describing, in general terms, overall operation of the prefilter of FIG. 2 in accordance with a preferred embodiment of the invention.

Referring to FIG. 4, prefilter 42 receives at 99 a block of data and determines at 100, a filter state value using the following relationship:

| | | |
|---|---|---|
| fil_state = 0, | for | q_state < min_state |
| fil_state = $\dfrac{(q\_state - min\_state)*max\_fil}{max\_state - min\_state}$ | for | min_state ≦ q_state, q_state ≦ max_state |
| fil_state = max_fil | for | q_state > max_state | where fil_state is the filter state value q_state is the quantizer state value min_state is the preselected adjustable minimum state value max_state is the preselected adjustable maximum state value max_fil is the preselected adjustable maximum filter value.

Figure 5:
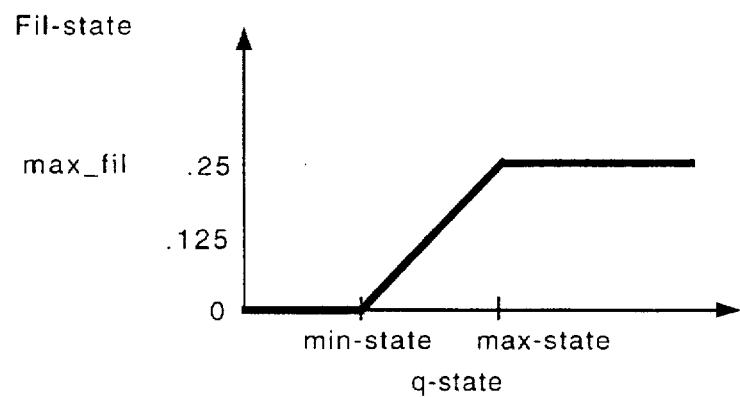
FIG. 5 is a graph showing the filter state value of the prefilter as a function of quantizer state.

Min_state, max_state and max_fil are variable parameters which are tuned by the designer to provide the desired amount of filtering. The filter state is shown graphically in FIG. 5 having a value of zero below the preselected minimum value, a maximum filter value, here 0.25, above the preselected maximum value and a filter state value linearly related to the quantizer state between the preselected minimum and maximum values.

Prefilter 42 then biases at 102 the logarithm of the error energy by adding a constant K, dependent on the particular coding mode (i.e., interframe, intraframe, or motion compensated mode) and determines the filter taps at 104 based on the weighted logarithm error energy for that particular block using the following relationship:

| | | |
|---|---|---|
| h(1) = 0, | for | w_ener < min_val |
| $h(1) = \dfrac{(w\_ener - min\_val)*fil\_state}{max\_val - min\_val}$ | for | min_val ≦ w_ener, w_ener ≦ max_val |
| h(1) = fil_state | for | w_ener > max_val | where h(1) is the amplitude of the outer tap.

min_val is the preselected adjustable minimum energy value max_val is the preselected adjustable maximum energy value w_ener is the weighted logarithm of the energy error value.

The weighted logarithm error energy (w_ener) is related to the logarithm energy of the block by the following relationship $$w\_ener = K*2 \log_2 (\text{energy of block}) + S$$

Where K represents a scaling factor, here having a value of sixteen to provide values in an accuracy range determined by the number of bits used by the processor, and a constant S associated with the particular coding method of the block.

Table I below, provides one example of a listing of the parameters preselected by the designer to provide filtering for one preferred embodiment.

TABLE I

| Parameter | Description | Value | Comment |
|---|---|---|---|
| max_state | adjustable maximum state for defining the quantization state above which maximum filtering is applied to the block | 83 | on scale of 0 to 99 |
| min_state | adjustable minimum state for defining the quantization state below which no filtering is applied to the block | 64 | on scale of 0 to 99 |
| max_val | adjustable maximum energy value above which maximum filtering is applied | 224 | weighted logarithm of the sum of the squared difference |
| min_val | adjustable minimum energy value below which no filtering is applied | 176 | weighted logarithm of the sum of the squared difference |
| $K_{inter}$ | interframe bias offset | 0 | |
| $K_{motion}$ | motion compensated bias offset | 16 | |
| $K_{intra}$ | intraframe bias offset | 50 | |
| max_fil | maximum filter outer tap | 42 | on scale of 0 to 128 |
| cutoff | filter cutoff value | 5 | on scale of 0 to 128 |

Min_val and max_val represent the minimum and maximum weighted logarithm error energy (w_ener), respectively, selected by the designer. It is important to note that the optimum values for the above parameters selected by the designer to achieve the best compromise between inadequate filtering which can cause loss of lip synchronization between the video image and the accompanying audio track, and excessive filtering which will cause a perceptive loss in clarity and resolution of uncovered background areas of the image.

The tuning parameters are adjusted with the following considerations.

max_state: If max_state is too high, coding artifacts in the image will become objectionable when a less intense motion source is provided. If max_state is too low, the image will appear excessively blurry before any coding artifacts are perceived.

min_state: If min_state is too low, areas of the image which did not have blocking artifacts or mosquitoes will be blurred thereby reducing the resolution of the image. If min_state is too high, coding artifacts will begin to be perceived when a less intense motion source is provided. Because max_state and min_state only operate at the macroblock level, max_val and min_val, the adjustable energies of the blocks, are used to provide a finer granularity in determining the appropriate filtering for a particular region of the picture. Max_val and min_val should be adjusted by the designer after the appropriate values have been determined for max_state and min_state, since the energies allow for "fine tuning" the filtering for specific portions of the macroblock.

The coding mode bias offset parameters (K_inter, K_motion, and K_intra) are used to provide a better indication of the type of motion taking place at a certain area of the image. For example, it is generally desirable to use less filtering on a large slowly moving area because the observer's eye can track movement easily and can notice the degradation in image quality. On the other hand, it is generally desirable to use heavier filtering on a portion of the image that changes abruptly because it is more important to quickly transmit an abrupt change than to accurately portray details of the dramatic change and lose real-time presence.

With these considerations in mind the coding mode bias offset parameters are generally adjusted as follows.

K_inter: If too large, areas of the image that gradually change will be too blurry.

K_motion: If too large, areas of the image that have smooth motion will be too blurry.

K_intra: If too large, areas of the image that have an abrupt change between frames will be too blurry. If too small, coding artifacts will be seen on areas that have an abrupt change between frames.

Max_fil provides an upper limit on the amount of filtering applied by the prefilter. Generally, if max_fil is too large the filter will generally not perform properly. The cutoff parameter is adjusted in relation to max_fil so that filtering is not applied to the block if the effects of filtering are too slight to provide any benefit.

Figure 6:
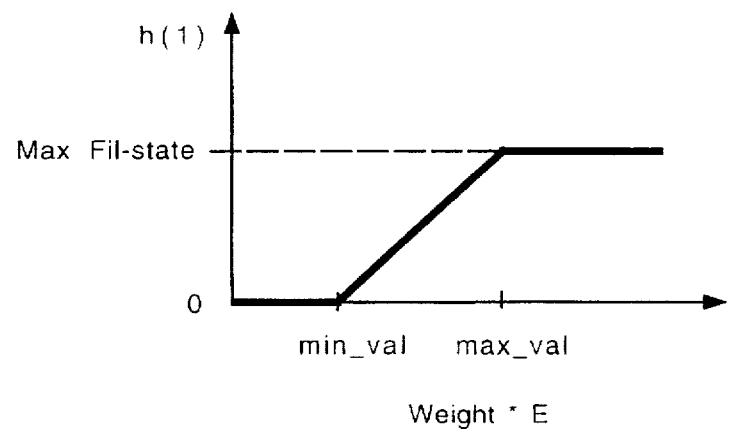
FIG. 6 is a graph showing the outer filter tap value of the prefilter as a function of the weighted logarithm of the error energy.

Referring to FIG. 6, the outer tap value h(−1) or h(1) is shown graphically as a function of the weighted error energy selected for a particular coding mode. Outer tap value h(1) has a value of zero below and a maximum value above the preselected minimum and maximum values, respectively, and has a value linearly related to the weighted logarithm of the energy between the preselected minimum and maximum values.

To eliminate unnecessary computations, prefiltering is not performed on the pairs of chrominance blocks associated with each macroblock. Further, a cutoff value is used which prevents any block from being filtered with prefilter 42 when the outer tap h(1) or h(−1) has a value close to zero. The cutoff value is a variable parameter which is adjustable in real-time so that, as noted at 106, if the value of h(1) is less than the cutoff value, the block is skipped and no filtering is performed (as indicated at 107). If the outer tap is greater than the filter cutoff value, the center tap h(0) of the prefilter is determined at 108.

Figure 7:
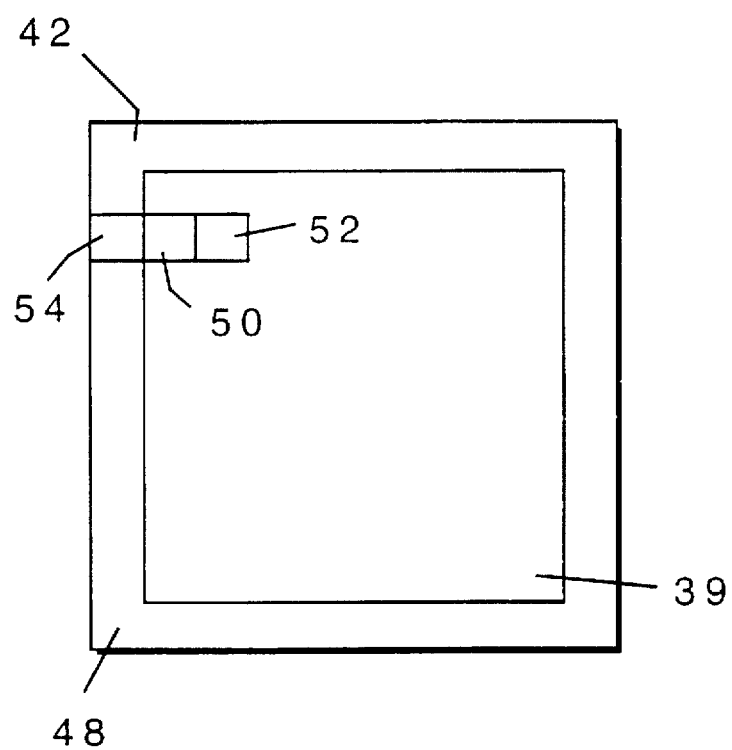
FIG. 7 is an illustrative diagram representing the image pixel data structure of a data block in accordance with a preferred embodiment of the invention.

Referring to FIG. 7, prefilter 42 filters each block 39 (FIG. 1) by first applying the filter in one dimension across each row of the block and then down each column of the block. This is indicated at 110. To ensure that block artifacts are not generated due to the prefiltering when pixels at block boundaries are filtered, filtering is performed across the block boundaries. Thus, in order to filter each pixel of an 8×8 block, a 10×10 window 48 is required by the prefilter 42. For example, to filter pixel 50 positioned along the boundary of 8×8 block 39, prefilter 42 uses adjacent neighboring pixel 52 within the block and an adjacent neighboring pixel 54 within the window 48. Pixel 54 is not actually filtered at this time but is used for determining the required filtering for pixel 50. In addition if the block being filtered is on an edge of the image, where no neighboring block exists, the pixels along that block boundary are not filtered.

Referring again to FIG. 2, the filtered pixel data of each block are then provided to a subtractor 44 which provides the resulting pixel error data E(i,j) based on the difference between the filtered pixel data from each block and a selected prediction from either the motion compensated reference block $M_c(i,j)$, the corresponding block of pixels $I_r(i,j)$ in the reconstructed frame or a zero reference frame. A switch 46 selects the appropriate reference block in response to the coding mode signal from encode selector 40.

Each selected 8×8 block of pixel error data E(i,j) is supplied to a two dimensional discrete cosine transform module (DCT) 16 which converts the 8×8 array of pixel error data E(i,j) into an 8×8 array of transform coefficients C(u,v). As is known in this field, the DCT transform is related to the Discrete Fourier Transform (DFT). Accordingly, the two dimensional array of discrete transform coefficients C(u,v) represents the two dimensional "spatial frequencies" within the block of pixel error data. The discrete cosine transform coefficient C(1,1) in the upper left hand corner of the coefficient array represents the DC component of the array of pixel error data. The remaining coefficients are referred to as the "AC coefficients". Each AC coefficient represents a spatial frequency component of the block of pixel error data.

Referring again to FIG. 1, the array of DCT coefficients C(u,v) is supplied to a quantizer 17 which quantizes each coefficient by dividing the coefficient by a selected quantization step size (i.e., 2 to 62 for the TSS H.261 standard). The quotient is rounded to the nearest integer to form a quantized coefficient $C_q(u,v)$. Accordingly, the quantized coefficients represent the array of DCT coefficients using fewer bits than the original DCT coefficients. The magnitude of step size used to quantize the coefficients is therefore chosen to control the number of bits required to represent the array. Preferably, the step size is chosen such that the quantized coefficients represent the original coefficients as accurately as possible using the number of bits allocated for transmission of the image data.

Each quantized coefficient $C_q(u,v)$ is supplied to an encoder 18 which further encodes the quantized coefficients, loads the data to be transmitted into a transmitter buffer 18a, and transmits the encoded coefficients $C_e$, the selected quantization step size $S_q$, and the coding method to the receiver 13. Other information, often called side information such as macroblock addressing, coding block pattern and motion vectors may be transmitted to the receiver as well (shown as SI on FIGS. 1, 2 and 8).

Figure 8:
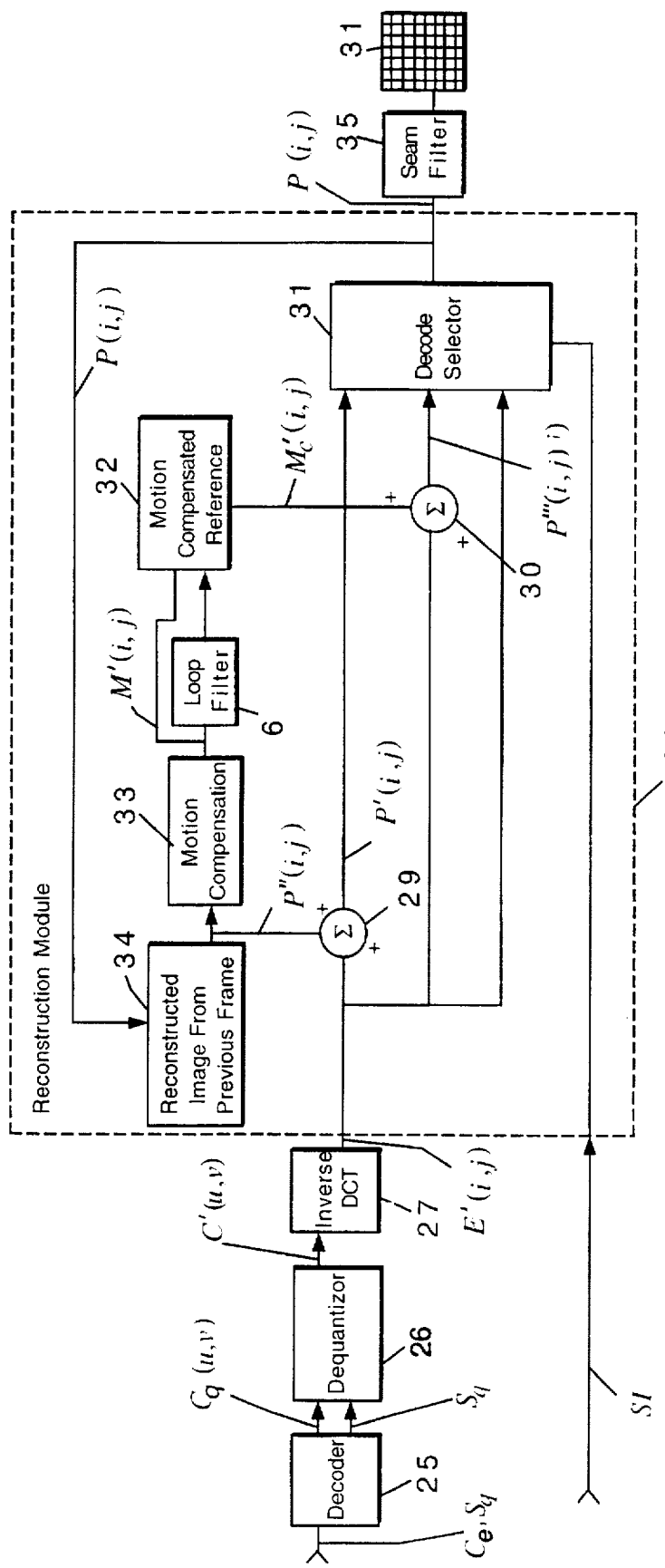
FIG. 8 is a block diagram of a receiver for decoding image data received from the transmitter to reconstruct the image.

Referring to FIG. 8, the receiver includes a decoder 25 which decodes the received coefficients $C_e$ to reproduce the quantized coefficients $C_q(u,v)$. Because the encoder 18 and decoder 25 are lossless, the quantized coefficients $C_q(u,v)$ reproduced by the decoder 25 are identical to those generated by the transmitter's quantizer 17, in the absence of transmission error.

A de-quantizer 26 multiplies each quantized coefficient $C_q(u,v)$ by the transmitter determined step size $S_q$ to produce the received coefficients C'(u,v). The received coefficients differ from the original coefficients C(u,v) due to the rounding operation performed by the transmitter. The error introduced by this rounding operation is referred to as the "quantization error".

The received coefficients C'(u,v) are supplied to an inverse DCT module 27 which converts the received coefficients back to an 8×8 array of pixel (error) data E'(i,j). A reconstruction module 28 reconstructs the pixel data P'(i,j) from the pixel error data E'(i,j).

More specifically, if intraframe encoding was used, a decode selector 31 treats the pixel error signal E'(i,j) as the reconstructed pixel data P'(i,j) without further processing. If interframe encoding was employed, the reconstruction module combines the error signal E'(i,j) with the appropriate reference image data to reconstruct the pixel data. For example, if the previous reconstructed frame was used as a reference, an adder 29 combines the pixel error data E'(i,j) with the reconstructed image data P"(i,j) from the previous frame buffer 34 to form the reconstructed pixel data P'(i,j) for the current frame. If the motion compensated reference was used, a motion compensation module 33 prepares a motion compensated block M'(i,j). If the motion compensated block was filtered at the transmitter, (as indicated by side information sent by the transmitter), a loop filter 6 filters the motion compensated block M'(i,j) and stores the result as a motion compensated reference $M_c'(i,j)$ in a motion compensated reference store 32. A second adder 30 combines the received error signal E'(i,j) with the motion compensated reference $M_c'(i,j)$ to form the reconstructed pixel data P"(i,j). The reconstructed pixel data P(i,j) is supplied to a reconstructed image store and previous frame buffer 34 for storing the reconstructed image.

Additions, subtractions, and other modifications of the preferred embodiments of the invention will be apparent to those practicing in the field and are within the scope of the following claims.

What is claimed is:

1. In a video imaging compression system, a method of transmitting an image frame as a sequence of block portions at a predetermined transmitter frame rate over a communications channel having a predetermined bandwidth, the method comprising the steps of:

determining, for the image frame being transmitted over the communications channel, a number of bits to be allocated on the basis of at least the bandwidth of the channel and transmitter frame rate, determining an expected number of bits for the image frame on the basis of an error energy value associated with the image frame and a quantizer state value, determining the expected number of bits including:

receiving the quantizer state value representative of the expected number of bits required for transmitting each block portion of the image, and receiving, for each said block portion, a weighted energy error value based on a preselected coding method for the block portion of the image frame;

determining a level of filtering to be applied to each said block portion of the image frame on the basis of the expected number of bits and the allocated number of bits for the image frame, determining the level of filtering further comprising the steps of:

determining, for each said block portion, one of a plurality of filter state values on the basis of a preselected adjustable minimum state value, a preselected adjustable maximum state value, a preselected adjustable maximum filter value, and the quantizer state value, and determining the level of filtering, for each said block portion, on the basis of a preselected adjustable minimum energy value, a preselected adjustable maximum energy value, the determined one of the plurality of filter state values, and the weighted energy error value; and applying the determined level of filtering for the block portion of data representing each said block portion, so that the cumulative sum of the expected number of bits for each said block portion of the image frame is substantially equal to the allocated number of bits of the image frame and the transmitter frame rate is substantially maintained.

2. An apparatus for reducing a number of expected bits needed to transmit block portions of an image frame, the apparatus comprising:

a processor which generates a quantizer state value representative of the expected number of bits required for transmitting each block portion of the image frame, and a weighted energy error value based on a preselected coding method for the block portion of the image frame, the processor determining a level of filtering, for each said block portion, on the basis of the quantizer state value and the weighted energy error value associated with each said block portion by determining, for each said block portion, one of a plurality of filter state values on the basis of a preselected adjustable minimum state value, a preselected adjustable maximum state value, a preselected adjustable maximum filter value, and the quantizer state value, the processor determining the level of filtering, for each said block portion, on the basis of a preselected adjustable minimum energy value, a preselected adjustable maximum energy value, a determined filter state value, and the weighted energy error value; and a filter which applies the determined level of filtering for the block of data representing the block portion whereby the expected number of bits needed to transmit each said block portion will be reduced depending upon the level of filtering.

3. The apparatus of claim 2 wherein said filter is a multi-tap filter which filters each of said block portions, said multi-tap filter having a center tap having an amplitude and a plurality of outer taps each having an amplitude, means for receiving the quantizer state value representative of the number of bits required for transmitting the image frame, means for receiving the weighted energy error value based on the preselected coding method of one of the block portions of the image frame, and means, responsive to the means for receiving a quantizer state value and means for receiving a weighted energy error value, for determining the amplitudes of said center and outer taps, for each said block portion, on the basis of the quantizer state value and the weighted energy error value based on said preselected coding method.

4. The apparatus of claim 3 wherein the multi-tap filter is a three-tap filter having a center tap and a pair of outer taps, the outer taps being of equal amplitude and being equally spaced from the center tap and the sum of the amplitudes of the center taps and outer taps is equal to unity.

5. In a video imaging compression system including an encoder, a method of reducing a number of bits expected to be required to transmit an image frame as a sequence of block portions, the method comprising the steps of:

receiving a quantizer state value representative of the expected number of bits required for transmitting the image frame, receiving, for each block portion, a weighted energy error value based on a preselected coding method for the block portion of the image frame, determining, for each said block portion, one of a plurality of filter state values on the basis of the relationship:

$$fil\_state = 0, \quad \text{for} \quad q\_state < min\_state$$

$$fil\_state = \frac{(q\_state - min\_state)*max\_fil}{max\_state - min\_state} \quad \text{for} \quad \begin{array}{l} min\_state \leq q\_state, \\ q\_state \leq max\_state \end{array}$$

$$fil\_state = max\_fil \quad \text{for} \quad q\_state > max\_state$$

where fil_state is a filter state value q_state is a quantizer state value min_state is a preselected adjustable minimum state value max_state is a preselected adjustable maximum state value max_fil is a preselected adjustable maximum filter value determining a level of filtering, for each said block portion, on the basis of the filter state value, and applying the determined level of filtering for the block of data representing the block portion whereby the expected number of bits needed of transmit each said block portion will be reduced depending upon the level of filtering.

6. The method of claim 5 wherein determining the level of filtering comprises the step of applying a multi-tap filter having a center tap and a plurality of outer taps to each said block portion.

7. The method of claim 6 wherein the multi-tap filter is a three tap filter having a center tap and a pair of outer taps, said outer taps being of equal amplitude and being equally spaced from the center tap and the sum of the amplitudes of the center tap and outer taps is equal to unity and determining the level of filtering, for each said block portion is determined on the basis of the relationship:

$$h(1) = 0, \quad \text{for} \quad w\_ener < min\_val$$

$$h(1) = \frac{(w\_ener - min\_val)*fil\_state}{max\_val - min\_val} \quad \text{for} \quad \begin{array}{l} min\_val \leq w\_ener, \\ w\_ener \leq max\_val \end{array}$$

$$h(1) = fil\_state \quad \text{for} \quad w\_ener > max\_val$$

where h(1) is the amplitude of the pair of outer tap, min_val is a preselected adjustable minimum energy value max_val is a preselected adjustable maximum energy value w_ener is a weighted logarithm of an energy error value.

8. In a video imaging compression system, a method of reducing a number of bits expected to be required to transmit an image frame as a sequence of block portions over a communications channel having a predetermined bandwidth, the method comprising the steps of:

determining a measure of an expected number of bits required for each block portion of the image frame being transmitted including:

receiving a quantizer state value representative of the expected number of bits required for transmitting each said block portion of the image, and receiving, for each said block portion, a weighted energy error value based on a preselected coding method for the block portion of the image frame;

determining a level of filtering to be applied to said each block portion, including:

determining, for each said block portion, one of a plurality of filter state values on the basis of a preselected adjustable minimum state value, a preselected adjustable maximum state value, a preselected adjustable maximum filter value, and the quantizer state value, the level of filtering to be applied determined on the basis of a preselected adjustable minimum energy value, a preselected adjustable maximum energy value, a determined filter state value, and the weighted energy error value; and applying the determined level of filtering for the block of data representing the block portion whereby the expected number of bits needed to transmit each said block portion will be reduced depending upon the level of filtering.

9. The method of claim 8 wherein the plurality of filter state values comprises a zero value, the preselected adjustable maximum filter value, and an intermediate filter state value between the zero value and the preselected adjustable maximum filter value.

10. The method of claim 9 wherein the intermediate filter state value is determined by the relationship $$fil\_state = \frac{(q\_state - min\_state) * max\_fil}{max\_state - min\_state}$$

where fil_state is the intermediate filter state value;

q_state is the quantizer state value;

min_state is the preselected adjustable minimum state value;

max_state is the preselected adjustable maximum state value; and max_fil is the preselected adjustable maximum filter value.

11. The method of claim 10 wherein the step of determining the level of filtering further comprises associating a zero value with no filtering and associating a selected maximum filter state value with maximum filtering.

12. The method of claim 9 wherein filter outer tap value is determined by the relationship $$outer\_tap = \frac{(weight\_ener - min\_val) * fil\_state}{max\_value - min\_val}$$

where outer_tap is an intermediate outer tap value;

weighted_ener is the weighted energy error value;

min_val is the preselected adjustable minimum energy value;

max_val is the preselected adjustable maximum energy value; and fil_state is one of the plurality of filter state values.

13. The method of claim 12 wherein the filtering is performed with a three-tap filter having a center tap and a plurality of outer taps and wherein the outer taps are of equal amplitude and are equally spaced from the center tap.

14. The method of claim 13 wherein the sum of the amplitudes of the center tap and outer taps is substantially equal to unity.

15. In a video imaging compression system including an encoder, a method of reducing a number of bits expected to be required to transmit an image frame as a sequence of block portions, the method comprising the steps of:

receiving a complexity value representative of the expected number of bits required for transmitting each block portion of the image frame, the complexity value being a quantizer state value, receiving, for each said block portion, a weighted energy error value based on a preselected coding method for the block portion of the image frame, determining a level of filtering, for each said block portion, on the basis of the complexity value and the weighted energy error value associated with each said block portion, determining the level of filtering further comprising the steps of:

determining, for each said block portion, one of a plurality of filter state values on the basis of a preselected adjustable minimum state value, a preselected adjustable maximum state value, a preselected adjustable maximum filter value, and the quantizer state value, and determining the level of filtering, for each said block portion, on the basis of a preselected adjustable minimum energy value, a preselected adjustable maximum energy value, a determined filter state value, and the weighted energy error value; and applying the determined level of filtering for the block of data representing the block portion whereby the expected number of bits needed to transmit each said block portion will be reduced depending upon the level of filtering.

16. The method of claim 15 further comprising the step of apportioning each block into rows and columns of pixels and applying the level of filtering to each row of pixels and then on each column of pixels of said each said block portion.

17. The method of claim 16 further comprising the step of applying an outer tap filter to each pixel using adjacent pixels.

18. The method of claim 17 further comprising the step of applying the outer tap filter to a pixel positioned on an outer boundary of the block using a pixel from an adjacent block.

19. The method of claim 15 further comprising the step of filtering the block of data with a multi-tap filter having a center tap and a plurality of outer taps.

20. The method of claim 19 further comprising the step of providing as the multi-tap filter, a three-tap filter having a center tap and a pair of outer taps.

21. The method of claim 20 further comprising the steps of identifying the plurality of filter state values as a zero value associated with no filtering, a preselected adjustable maximum filter value associated with maximum filtering, and an intermediate filter state value between the zero value and the preselected adjustable maximum filter value.

22. The method of claim 21 further comprising the step of determining the intermediate filter state value by the relationship $$fil\_state = \frac{(q\_state - min\_state) * max\_fil}{max\_state - min\_state}$$

where fil_state is the intermediate filter state value q_state is the quantizer state value min_state is the preselected adjustable minimum state value max_state is the preselected adjustable maximum state value max_fil is the preselected adjustable maximum filter value.

23. The method of claim 22 further comprising the step of providing the quantizer state value with a value between 0 and 99, the preselected adjustable minimum state value with a value of 64, the preselected adjustable maximum state value with a value of 83, and the preselected adjustable maximum filter value with a value of 42.

24. The method of claim 22 wherein determining the level of filtering further comprises associating a zero value with no filtering, associating the preselected adjustable maximum state value with maximum filtering, and wherein a filter outer tap value is between the zero value and the preselected adjustable maximum state value.

25. The method of claim 24 further comprising the step of determining the filter outer tap value by the relationship $$outer\_tap = \frac{(weight\_ener - min\_val) * fil\_state}{max\_val - min\_val}$$

where outer_tap is the filter outer tap value weighted_ener is the weighted energy error value min_val is a preselected adjustable minimum energy value max_val is a preselected adjustable maximum energy value fil_state is one of the plurality of filter state values.

\* \* \* \* \*